US012719177B2

(12) United States Patent
Jiang et al.

(10) Patent No.: US 12,719,177 B2
(45) Date of Patent: Aug. 25, 2026

(54) ELECTRONIC DEVICES WITH MILLIMETER WAVE ANTENNAS

(71) Applicant: Apple Inc., Cupertino, CA (US)

(72) Inventors: Yi Jiang, Cupertino, CA (US); Jiangfeng Wu, San Jose, CA (US); Lijun Zhang, Los Gatos, CA (US); Mattia Pascolini, San Francisco, CA (US); Simon G Begashaw, Santa Clara, CA (US); Siwen Yong, San Francisco, CA (US)

( * ) Notice: Subject to any disclaimer, the term of this patent is extended or adjusted under 35 U.S.C. 154(b) by 186 days.

(21) Appl. No.: 18/441,656

(22) Filed: Feb. 14, 2024

(65) Prior Publication Data

US 2024/0186721 A1 Jun. 6, 2024

Related U.S. Application Data

(63) Continuation of application No. PCT/US2022/041744, filed on Aug. 26, 2022.

(60) Provisional application No. 63/241,338, filed on Sep. 7, 2021.

(51) Int. Cl.

*H01Q 21/06* (2006.01)
*G02B 27/01* (2006.01)
*H01Q 1/27* (2006.01)
*H01Q 1/40* (2006.01)

(52) U.S. Cl.

CPC ........... *H01Q 21/06* (2013.01); *G02B 27/017* (2013.01); *H01Q 1/276* (2013.01); *H01Q 1/405* (2013.01)

(58) Field of Classification Search

CPC ......... H01Q 1/276; H01Q 1/405; H01Q 21/06
See application file for complete search history.

(56) References Cited

U.S. PATENT DOCUMENTS

| | | | | |
|---|---|---|---|---|
| 7,161,555 | B2 | 1/2007 | Ohno et al. | |
| 9,153,856 | B2 * | 10/2015 | Rappoport | H01Q 1/48 |
| 10,594,019 | B2 | 3/2020 | Baks et al. | |

(Continued)

FOREIGN PATENT DOCUMENTS

| | | | | |
|---|---|---|---|---|
| CN | 111276800 A | * 6/2020 | | H01Q 1/48 |
| CN | 111725607 A | * 9/2020 | | H01Q 9/0414 |
| JP | 3213873 U | * 12/2017 | | H01Q 21/062 |

OTHER PUBLICATIONS

Treacy Siobhan, VR headset allows user to make eye contact with people around them, Electronics360, Aug. 6, 2021, pp. 1-2, GlobalSpec.

*Primary Examiner* — Hoang V Nguyen
(74) *Attorney, Agent, or Firm* — Treyz Law Group, P.C.; Tianyi He

(57) ABSTRACT

A head-mounted device may have a head-mounted housing that is configured to be worn on a head of a user. While the head-mounted device is being worn, left and right displays in optical modules in the head-mounted device may provide images to eye boxes located rearward of the head-mounted device. A forward-facing publicly viewable display on a front portion of the head-mounted device may be covered with a transparent housing portion forming a display cover layer. Millimeter wave antennas may be mounted under a dielectric member that is interposed between the antennas and an edge portion of the transparent housing portion. The antennas may have planar outer surfaces. The dielectric member may have a planar surface separated from the planar outer surfaces by air gaps and a curved outer surface.

20 Claims, 4 Drawing Sheets

(56) References Cited

U.S. PATENT DOCUMENTS

| | | | | |
|---|---|---|---|---|
| 10,777,895 | B2 | 9/2020 | Paulotto et al. | |
| 10,895,634 | B2 | 1/2021 | Nath et al. | |
| 10,978,797 | B2 | 4/2021 | Edwards et al. | |
| 2012/0249388 | A1 | 10/2012 | Hansen et al. | |
| 2019/0020110 | A1 | 1/2019 | Paulotto et al. | |
| 2019/0319367 | A1 | 10/2019 | Edwards et al. | |
| 2020/0344341 | A1* | 10/2020 | Lynch | H04M 1/0202 |

* cited by examiner

ELECTRONIC DEVICES WITH MILLIMETER WAVE ANTENNAS

This application is a continuation of international patent application No. PCT/US2022/041744, filed Aug. 26, 2022, which claims priority to U.S. provisional patent application No. 63/241,338, filed Sep. 7, 2021, which are hereby incorporated by reference herein in their entireties.

FIELD

This relates generally to electronic devices, and, more particularly, to electronic devices with components such as antennas.

BACKGROUND

Electronic devices such as head-mounted devices and other devices may have input-output components. The input-output components may include components such as antennas for handling wireless communications.

SUMMARY

A head-mounted device may have a head-mounted housing that is configured to be worn on a head of a user. The head-mounted device may have a display that is overlapped by a display cover layer. Millimeter wave antennas may be mounted under an edge portion of the display cover layer.

The edge portion of the display cover layer may have a curved inner surface. Each millimeter wave antenna may have an array of patch antenna elements or other millimeter wave antenna elements on a planar substrate. The millimeter wave antennas may face the edge portion of the display cover layer. A dielectric member (sometimes referred to as a dielectric structure or dielectric layer) may be interposed between the edge portion of the display cover layer and the millimeter wave antennas. The dielectric member may have a curved outer surface adjacent to the curved inner surface of the display cover layer and may have an opposing planar inner surface. The planar inner surface of the dielectric member may be parallel to the planar outer surfaces of each of the millimeter wave antennas. An air gap may separate each millimeter wave antenna from the planar inner surface of the dielectric member.

DETAILED DESCRIPTION

Electronic devices may be provided with components such as antennas. The electronic devices may include portable electronic devices, wearable devices, desktop devices, embedded systems, and other electronic equipment. Illustrative configurations in which the electronic devices include a head-mounted device may sometimes be described herein as an example.

The antennas in an electronic device may be configured to cover communications bands of interest (e.g., local area network bands, cellular telephone bands, etc.). To handle some communications such as 5G cellular communications, the antennas may include millimeter wave antennas (e.g., antennas operating at one or more frequencies between 20 GHz and 300 GHz, as an example). A millimeter wave antenna may use a phased-antenna array architecture in which multiple antenna elements such as patch antenna elements are arranged in an array (e.g., multiple patches in a row). During operation, the relative phases of each of the elements may be adjusted (e.g., so that the phased-antenna array performs beam steering).

Electronic device housing structures and other parts of an electronic device may include areas that are characterized by curved surfaces that can be flattened into a plane without distortion (sometimes referred to as developable surfaces or curved surfaces without compound curvature). Electronic device housing structures and other parts of an electronic device may also include areas that are characterized by compound curvature (surfaces that can only be flattened into a plane with distortion, sometimes referred to as non-developable surfaces). Mounting millimeter wave antennas and/or other antennas in an electronic device with curved surfaces can be challenging, because the presence of a curved surface adjacent to an antenna may give rise to different amounts of loading for different antenna elements in the antenna.

To help ensure satisfactory antenna operation when integrating a millimeter wave antenna into an electronic device with a curved structure, a dielectric member (sometimes referred to as a dielectric structure or dielectric layer) may be provided between the curved structure and the antenna. The dielectric member may have a planar surface facing the antenna. As an example, in a head-mounted device with a curved display cover layer, a polymer layer with a planar surface facing an antenna may be placed between the antenna and the curved display cover layer. In this way, the dielectric structure may help even out the amount of loading experienced by each antenna element in the antenna. The dielectric structure may also assist in impedance matching.

Figure 1:
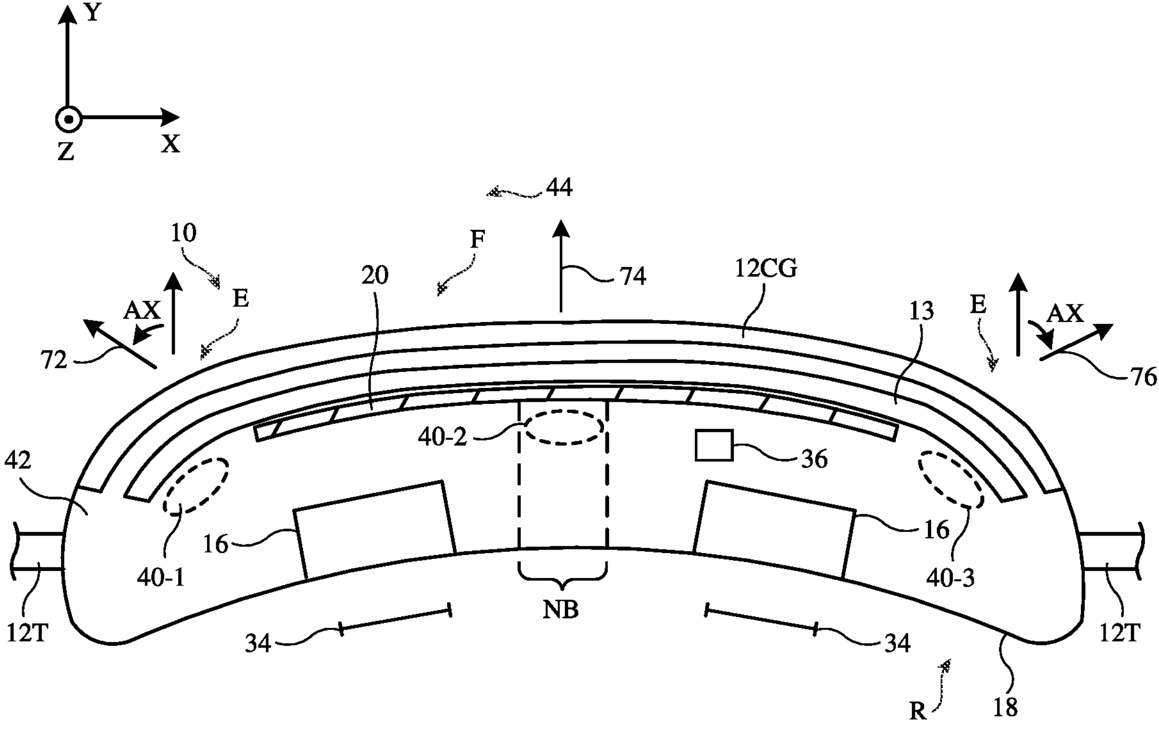
FIG. 1 is a top view of an illustrative electronic device with an antenna in accordance with an embodiment.

FIG. 1 is a top view of an illustrative electronic device having antennas such as one or more millimeter wave antennas. In the example of FIG. 1, device 10 is a head-mounted device. In general, device 10 may be any suitable electronic equipment.

As shown in FIG. 1, head-mounted device 10 may include housing 12. Housing 12 is configured to be worn on a user's head and may sometimes be referred to as a head-mounted housing or head-mounted support structure. Housing 12 may have curved head-shaped surfaces, a nose-bridge portion such as portion NB that is configured to rest on a user's nose when device 10 is on a user's head, may have a headband such as strap 12T for supporting device 10 on the user's head, and/or may have other features that allow device 10 to be worn by a user.

Housing 12 may have walls or other structures that separate an interior region of device 10 such as interior region 42 from an exterior region surrounding device 10 such as exterior region 44. As an example, housing 12 may include a transparent layer that forms a housing wall on front F of device 10 such as display cover layer 12CG. Housing 12 may also include internal frame structures (e.g., a metal chassis), cosmetic covering members, polymer layers (e.g., fully or partly transparent polymer layers), housing walls formed from polymer and/or other materials, and/or other housing structures. In an illustrative configuration, housing 12 includes a dielectric structure such as dielectric member 13 that is overlapped by display cover layer 12CG. Dielectric member 13, which may sometimes be referred to as a polymer layer, shroud, dielectric layer, or dielectric structure, may be formed from one or more individual dielectric structures (e.g., structures formed from polymer, glass, ceramic, and/or other dielectric). Member 13 may be formed in a ring shape that runs along the periphery of cover layer 12CG (e.g., under peripheral edge portion E of cover layer 12CG) or may, as shown in FIG. 1, overlap substantially all of display cover layer 12CG.

Display cover layer 12CG and member 13 may overlap a forward-facing display such as display 20 (e.g., a flexible display panel formed from a pixel array based on organic light-emitting diodes or other display panel). The portion of member 13 that overlaps display 20 may be formed from fully transparent polymer or partly transparent polymer that helps hide display 20 from view. The portion of member 13 in edge portion E may be opaque or transparent. Display cover layer 12CG may be formed from transparent polymer or glass (as examples).

Portions of display cover layer 12CG and member 13 such as edge portions of display cover layer 12CG and member 13 that surround display 20 may have curved cross-sectional profiles. As an example, edge portion E of cover layer 12CG and the underlying edge portion of member 13 may have one or more surfaces characterized by compound curvature (e.g., non-developable surfaces). The central portions of display cover layer 12CG and member 13 that overlap pixels of display 20 may have compound curvature and/or may have developable surfaces. In an illustrative arrangement, cover layer 12CG has inner and outer surfaces with compound curvature and member 13 has an outer surface of compound curvature around the edges of device 10 (e.g., the portion of member 13 surrounding display 20) and has developable inner and outer surfaces overlapping display 20. In the areas of compound curvature, at least some portions of the curved surface of layer 12CG and/or member 13 may be characterized by a radius of curvature R of 4 mm to 250 mm, 8 mm to 200 mm, 10 mm to 150 mm, at least 5 mm, at least 12 mm, at least 16 mm, at least 20 mm, at least 30 mm, less than 200 mm, less than 100 mm, less than 75 mm, less than 55 mm, less than 35 mm, and/or other suitable amount of curvature. In this illustrative configuration, display 20 may be a flexible display panel that is bent into a curved shape (e.g., a curved shape following the curved face of a user) and that is characterized by inner and outer developable surfaces. The portion of member 13 overlapping display 20 may have corresponding inner and outer developable surfaces. The innermost surface of member 13 in edge portion E may be planar to accommodate millimeter wave antennas. Other arrangements for the shapes of display cover layer 12CG and member 13 may be used in device 10, if desired.

Device 10 may include millimeter wave antennas and other antennas. Millimeter wave antennas may use phased-antenna arrays to implement beam steering. Each millimeter wave antenna may have an associated angle of view. To help provide satisfactory antenna coverage for device 10 at millimeter wave frequencies, it may be desired to provide device 10 with multiple millimeter wave antennas and to orient each of these antennas in a different direction so that the angular coverage of each of the antennas overlaps.

Consider, as an example, illustrative device 10 of FIG. 1, which has three millimeter wave antennas, each of which is pointed in a different direction. A first of the three antennas (millimeter wave antenna 40-1) is located under edge portion E of member 13 and cover layer 12CG on the left side of device 10. Antenna 40-1 is oriented in direction 72, which is rotated counter clockwise by angle AX relative to the Y axis (where the Y axis is oriented in the forward direction facing outwardly in front of device 10). A second of the three antennas (millimeter wave antenna 40-2) is located in the center of device 10, and, in this illustrative example, points straight ahead (in direction 74, along the Y axis). A third of the three antennas (millimeter wave antenna 40-3) is oriented in direction 76, which is rotated clockwise by an angle AX relative to the Y axis. Directions 72, 74, and 76 may each lie in the XY plane of FIG. 1 or may be angled above or below the XY plane. With this type of arrangement, each antenna has a respective angle of view VA (e.g., a value within the range of 15°-90°, as an example). By overlapping the angle-of-view coverage of each antenna (e.g., by pointing antenna 40-1 slightly to the left of center, by pointing antenna 40-2 straight ahead, and by pointing antenna 40-3 slightly to the right of center), device 10 can be provided with a larger angular coverage at millimeter wave frequencies than if only one of these antennas were to be used.

During operation, device 10 may receive image data (e.g., image data for video, still images, etc.) and may present this information on the displays of optical modules 16. Device 10 may also receive other data, control commands, user input, etc. Device 10 may transmit data to accessories and other electronic equipment. For example, image data from a forward-facing camera may be provided to an associated device, audio output may be provided to a device with speakers such as a headphone device, user input and sensor readings may be transmitted to remote equipment, etc.

Communications such as these may be supported using wired and/or wireless communications. In an illustrative configuration, components 36 may include wireless communications circuitry for supporting wireless communications between device 10 and remote wireless equipment (e.g., a cellular telephone, a wireless base station, a computer, headphones or other accessories, a remote control, peer devices, internet servers, and/or other equipment). Wireless communications may be supported using one or more antennas operating at one or more wireless communications frequencies (see, e.g., antennas 40-1, 40-2, and 40-3 of FIG. 1). In an illustrative configuration, one or more antennas may be coupled to wireless transceiver circuitry. The wireless transceiver circuitry may include transmitter circuitry configured to transmit wireless communications signals using the antenna(s) and receiver circuitry configured to receive wireless communications signals using the antenna(s).

The wireless circuitry of device 10 may be formed from one or more integrated circuits, power amplifier circuitry, low-noise input amplifiers, passive RF components, one or more antennas, transmission lines, and other circuitry for handling RF wireless signals. The wireless circuitry may include radio-frequency transceiver circuitry for handling various radio-frequency communications bands. For example, the wireless circuitry of device 10 may include wireless local area network (WLAN) and wireless personal area network (WPAN) transceiver circuitry. This transceiver circuitry may handle 2.4 GHz and 5 GHz bands for WiFi® (IEEE 802.11) communications and other WLAN communications and the 2.4 GHz Bluetooth® communications band or other WPAN bands and may sometimes be referred to herein as WLAN/WPAN transceiver circuitry or local transceiver circuitry.

The wireless circuitry of device 10 may use remote wireless circuitry such as cellular telephone transceiver circuitry for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz. If desired, the cellular telephone transceiver circuitry may support 5G communications using a low band at 600-850 MHz, a mid-band at 2.5-3.7 GHz, and a high band at 25-39 GHz. Wireless communications may also be provided using other frequency ranges (e.g., frequencies above 100 MHz, above 1 GHz, 1-30 GHz, 100 Mhz-300 GHz, 24 GHz, less than 300 GHz, less than 100 GHz, 10-300 GHz or other millimeter wave frequencies, and/or other suitable frequencies). WLAN/WPAN transceiver circuitry and/or cellular transceiver circuitry may handle voice data and non-voice data.

If desired, the antennas and other wireless circuitry of device 10 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals are received from a constellation of satellites orbiting the earth. Wireless circuitry in device 10 can include circuitry for other short-range (local) and long-range (remote) wireless links if desired. For example, wireless circuitry in device 10 may be provided to receive television and radio signals, paging signals, near field communications (NFC) signals at 13.56 MHz or other suitable NFC frequencies, ultrawideband (UWB) signals (e.g., UWB signals from 6-8.5 GHz, UWB signals from 3.5-9 GHz, etc.). Wireless circuitry in device 10 may also include antennas and transceiver for handling sensing applications (e.g., radar). If desired, antennas may be provided in arrays (e.g., phased antenna arrays) that support beam steering. These arrangements and other arrangements may be used in supporting wireless communications, wireless sensing, wireless location services, wireless power, and other wireless operations.

The wireless circuitry of device 10 may include antennas that are formed using any suitable antenna types. For example, the antennas of device 10 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, coils, hybrids of these designs, etc. If desired, one or more of the antennas may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna in device 10 may be used to handle communications in a WiFi® or Bluetooth® communication band while also handling communications at one or more cellular telephone frequencies. In some configurations, some cellular telephone communications (e.g., low-band and mid-band communications) may be handled using a first antenna (e.g., an inverted-F antenna), whereas other communications (e.g., high-band cellular communications) may be handled using one or more phased antenna arrays (e.g., multiple linear patch antenna arrays each of which is mounted in a different orientation and each of which has a different angle of view so that a desired amount of angular coverage is achieved).

To provide antenna structures in device 10 with the ability to cover different frequencies of interest, one or more of the antennas of device 10 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) in device 10 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line paths may be used to convey antenna signals between the radio-frequency transceiver circuitry of device 10 and the antenna(s) of device 10. These paths may include one or more radio-frequency transmission lines (sometimes referred to herein as transmission lines). Radio-frequency transmission line paths may each include a positive signal conductor and a ground signal conductor. Transmission lines in device 10 may include coaxial cable transmission lines, stripline transmission lines, microstrip transmission lines, edge-coupled microstrip transmission lines, edge-coupled stripline transmission lines, transmission lines formed from waveguide structures (e.g., coplanar waveguides or grounded coplanar waveguides), combinations of these types of transmission lines and/or other transmission line structures.

If desired, matching networks may be used to help match impedances in the wireless circuitry of device 10. A matching network may, for example, include components such as inductors, resistors, and capacitors configured to match the impedance of an antenna to the impedance of an associated radio-frequency transmission line path that is used in coupling the antenna to a transceiver. Matching network components may be provided as discrete components (e.g., surface mount technology components) or may be formed from housing structures, printed circuit board structures, traces on plastic supports, etc. Components such as these may also be used in forming antenna filter circuitry and may be tunable and/or fixed components.

Radio-frequency transmission line paths may be coupled to antenna feed structures associated with antennas in device 10. As an example, an antenna in device 10 such as an inverted-F antenna, a planar inverted-F antenna, a patch antenna, a loop antenna, or other antenna may have an antenna feed with a positive antenna feed terminal and a ground antenna feed terminal. The positive antenna feed terminal may be coupled to an antenna resonating (radiating) element within the antenna. The ground antenna feed terminal may be coupled to an antenna ground in the antenna. The positive feed terminal may be coupled to a positive signal line in a transmission line and the ground feed terminal may be coupled to a ground signal line in the transmission line.

Other types of antenna feed arrangements may be used if desired. For example, an antenna may be fed using multiple feeds each coupled to a respective port of a transceiver over a corresponding transmission line. If desired, a given transmission line signal conductor may be coupled to multiple locations on an antenna and/or switches may be interposed within the paths between a transceiver and the feed terminals of an antenna.

Figure 2:
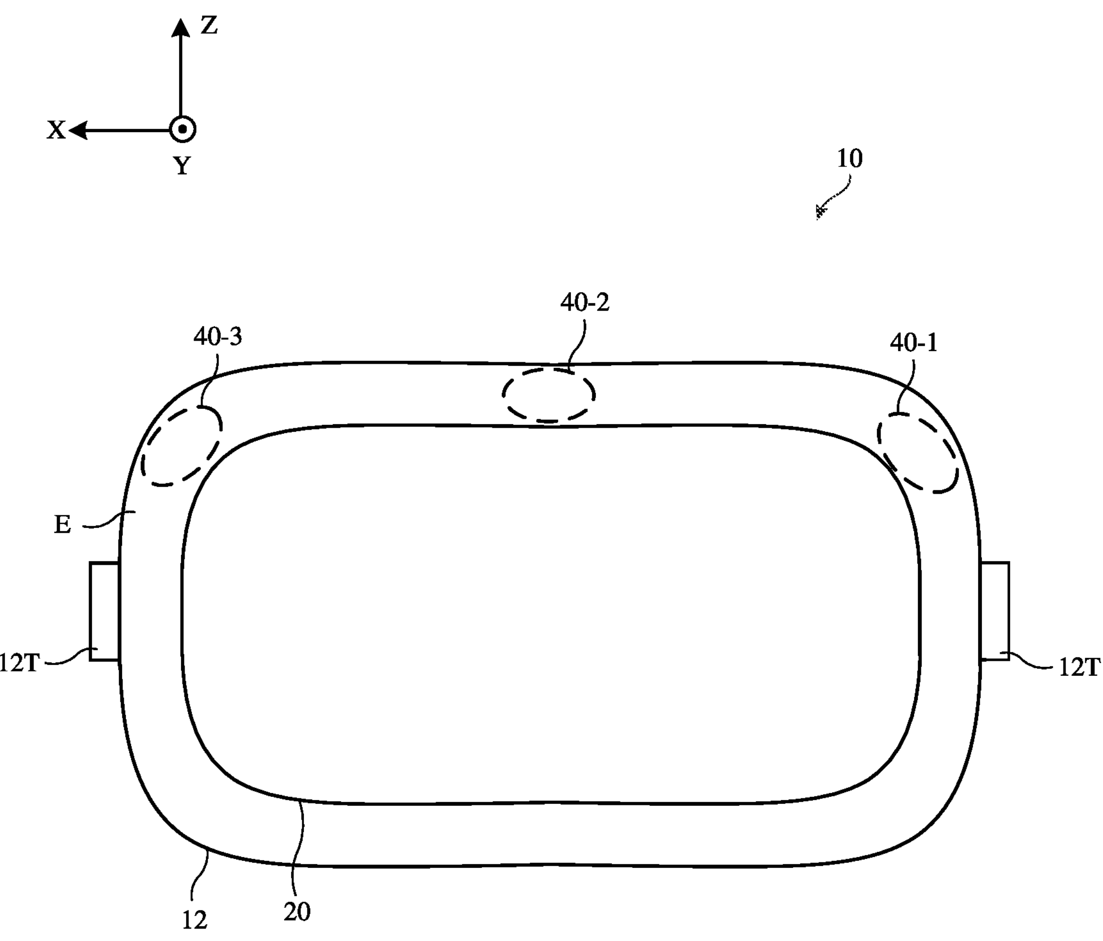
FIG. 2 is a front view of an illustrative antenna for an electronic device in accordance with an embodiment.

FIG. 2 is a front view of device 10 showing illustrative locations for millimeter wave antennas 40-1, 40-2, and 40-3. As shown in FIG. 2, front-facing display 20 may be surrounded by peripheral edge portions E of display cover layer 12CG (which may be formed from dielectric materials such as glass and/or polymer) and dielectric member 13, and these dielectric structures may overlap antennas 40-1, 40-2, and 40-3. During operation, transmitted antenna signals from the millimeter wave antennas and received antenna signals for the millimeter wave antennas may pass through display cover layer 12CG and member 13. To enhance antenna efficiency, conductive structures such as conductive pixel structures and other conductive structures associated with display 20 may be present only in the center of device 10 (e.g., edge portions E may be free of any conductive display structures overlapping the millimeter wave antennas).

Figure 3:
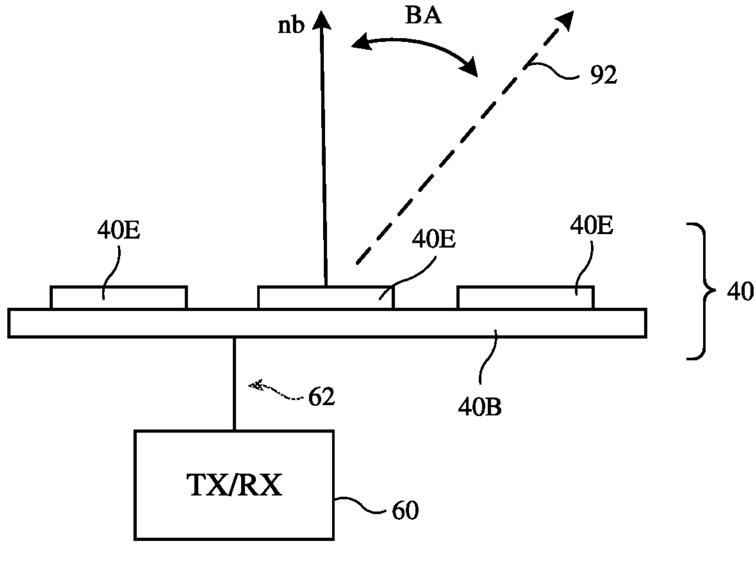
FIG. 3 is a side view of an illustrative millimeter wave antenna having an array of patch antenna elements in accordance with an embodiment.

FIG. 3 is a cross-sectional side view of an illustrative millimeter wave antenna. As shown in FIG. 3, the wireless circuitry of device 10 includes radio-frequency transceiver 60. Transceiver 60 may be coupled to antenna 40 by signal path 62 (e.g., one or more transmission lines). The configuration of millimeter wave antenna 40 of FIG. 3 may be used for antenna 40-1, may be used for antenna 40-2, and may be used for antenna 40-3. As shown in FIG. 3, millimeter wave antenna 40 may have multiple antenna elements 40E. Elements 40E may be formed from millimeter wave antenna resonating elements such as patch antenna elements (e.g., patch antennas formed from thin-film metal structures). The patch antennas may be arranged in a linear array (e.g., a line) on antenna substrate 40B (e.g., a printed circuit substrate, a ceramic or glass layer, or other dielectric substrate). A ground for antenna 40 may be formed from a ground antenna trace in substrate 40B and/or other conductive structures in device 10 (e.g., a metal chassis in device 10, a heat sink in device 10, a support bracket in device 10, etc.). Antenna 40 (e.g., elements 40E and substrate 40B) may have a planar surface that is characterized by a surface normal (see, e.g., surface normal nb of FIG. 3). During operation, the control circuitry of device 10 may perform beam steering operations by adjusting the relative phases of the signals for each respective element 40E. In this way, angle BA of antenna beam direction 92 relative to antenna surface normal nb (e.g., the direction in which antenna 40 is nominally pointed) may be adjusted (e.g., to ensure that antenna signals are transmitted and received along a direction that provides satisfactory antenna performance).

Antennas may be mounted within device 10 using mounting brackets, using biasing structures that press antenna components against housing structures, using adhesive, using screws and other fasteners, using press-fit connections, using solder, welds, conductive adhesive, and/or other conductive attachment mechanisms, using one or more frames, carriers, and/or other internal support structures, and/or other mounting arrangements.

To ensure even loading for each of elements 40E, antenna 40 may be mounted adjacent to a planar dielectric structure that is evenly spaced from each of elements 40E. In arrangements such as the arrangement of FIGS. 1 and 2, in which edge portion E of display cover layer 12CG has an inner surface with a curved cross-sectional profile (e.g., an inwardly facing concave surface of compound curvature), a dielectric structure such as dielectric member 13 that is located between display cover layer 12CG and antenna 40 may be used to form the planar dielectric structure. (Arrangements in which the planar inner surface is formed directly on the inner side of layer 12CG and in which member 13 is omitted may also be used, if desired).

Figure 4:
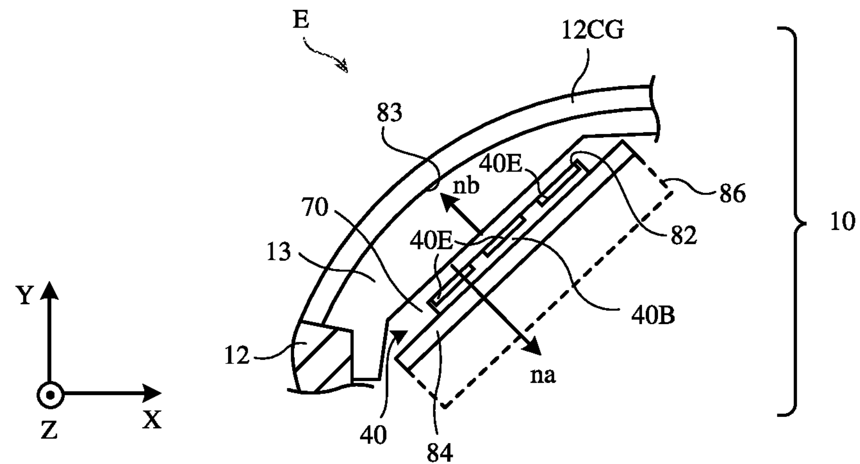
FIG. 4 is a cross-sectional side view of a corner portion of an illustrative head-mounted device with an antenna in accordance with an embodiment.

Consider, as an example, the top cross-sectional view of the left front corner of device 10 that is shown in FIG. 4. As shown in FIG. 4, the inner and outer surfaces of display cover layer 12CG (e.g., the surfaces of edge portion E of layer 12CG) may have curved cross-sectional profiles. These surfaces may have compound curvature. For example, inner surface 83 of display cover layer 12CG may be a concave surface of compound curvature. Antenna elements 40E of antenna 40 are supported on planar outer surface 82 of substrate 40B. To equalize antenna loading for each of the elements 40E in antenna 40 and thereby facilitate beam forming by antenna 40, dielectric member 13 may be provided with planar inner surface 70 that is parallel to planar surface 82 (e.g., surface normal na of surface 70 may be parallel to surface normal nb of surface 82). This ensures that each antenna element 40E will be separated from surface 70 by an air gap of equal size, thereby ensuring equal loading on each element 40E.

The outer surface of member 13 may be curved (e.g., the outer surface of member 13 that is attached to or adjacent to inner surface 83 of layer 12CG may have a convex shape such as a convex shape with compound curvature that matches the concave shape of surface 83). The permittivity of member 13, the thickness of member 13, and the size of the air gap between antenna 40 and member 13 may be selected to help match the impedance of antenna 40 to the impedance of layer 12CG, thereby reducing antenna signal reflections. In an illustrative configuration, the permittivity of layer 12CG has a first permittivity value, the permittivity of air has a second permittivity value that is lower than the first permittivity value, and the permittivity of the polymer that makes up member 13 has a third permittivity value that is between the first and second values. This configuration may help match the impedance of antenna 40 to that of layer 12CG. The presence of the air gap between antenna 40 and member 13 may help reduce surface waves and may facilitate assembly of device 10 (e.g., by physically decoupling antenna 40 from overlapping structures such as member 13).

Antenna 40 may be supported on internal housing structures and/or other support structures (see, e.g., illustrative support structures 86 of FIG. 4). The support structures under antenna 40 may include a metal plate and/or other heatsink structure (see, e.g., heat sink 84). In the illustrative configuration of FIG. 4, antenna 40 is located on the left front corner of device 10 (e.g., antenna 40 of FIG. 4 may serve as antenna 40-1 of FIG. 1). If desired, the approach of FIG. 4 may be used to form antenna 40-3 on the right front corner of device.

Figure 5:
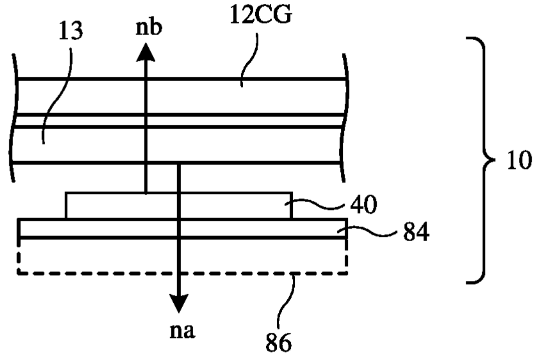
FIG. 5 is a cross-sectional view of a front portion of an illustrative head-mounted device with an antenna in accordance with an embodiment.

In the center of device 10, antenna 40-2 may be installed using an arrangement of the type shown in the top view of FIG. 5. A shown in FIG. 5, antenna 40 (e.g., antenna 40-2 of FIG. 1) may be mounted on heatsink 84 and support structure 86 so that the planar outer surface of antenna 40 faces an opposing inwardly facing planar surface of member 13. The adjacent surfaces of member 13 and antenna 40 may be parallel to each other (e.g., surface normal na may be parallel to surface normal nb).

In some embodiments, sensors may gather personal user information. To ensure that the privacy of users is preserved, all applicable privacy regulations should be met or exceeded and best practices for handling of personal user information should be followed. Users may be permitted to control the use of their personal information in accordance with their preferences.

In accordance with an embodiment, an electronic device is provided that includes a housing, a display, a dielectric layer having a first surface that has a curved cross-sectional profile and having an opposing second surface that is planar, and a millimeter wave antenna adjacent to the second surface.

In accordance with another embodiment, the millimeter wave antenna includes an array of millimeter wave patch antenna elements on an antenna substrate with a planar outer surface, the planar outer surface is characterized by a first surface normal, and the second surface is characterized by a second surface normal that is parallel to the first surface normal.

In accordance with another embodiment, the electronic device includes a display cover layer overlapping the display and overlapping the dielectric layer.

In accordance with another embodiment, the display cover layer includes a glass layer.

In accordance with another embodiment, the glass layer has an inner surface that has a curved cross-sectional profile, the dielectric layer is between the glass layer and the millimeter wave antenna, the first surface faces the inner surface of the glass layer, and the second surface faces the planar outer surface of the antenna substrate.

In accordance with another embodiment, the dielectric layer includes polymer.

In accordance with another embodiment, the dielectric layer and the millimeter wave antenna are configured so that there is an even-thickness air gap between the planar outer surface and the second surface.

In accordance with another embodiment, the housing includes a head-mounted housing, the electronic device includes left and right displays facing away from the display that are configured to display respective left and right images to left and right eye boxes.

In accordance with another embodiment, the electronic includes a display cover layer overlapping the display, the display cover layer has an edge portion that overlaps the dielectric layer and the millimeter wave antenna.

In accordance with another embodiment, the edge portion has a concave inner surface of compound curvature.

In accordance with another embodiment, the first surface of the dielectric layer is convex and has compound curvature.

In accordance with an embodiment, a head-mounted device is provided that includes a head-mounted housing, left and right rear-facing displays in the head-mounted housing that are configured to display respective left and right images to eye boxes, a publicly viewable display facing away from the eye boxes, a dielectric layer having an outer surface with a curved cross-sectional profile and having a planar inner surface, and an antenna having an array of antenna elements on a planar substrate, the antenna has a planar outer surface separated from the planar inner surface by an air gap.

In accordance with another embodiment, the head-mounted device includes a display cover layer overlapping the publicly viewable display.

In accordance with another embodiment, the display cover layer has an edge portion with a curved cross-sectional profile that overlaps the dielectric layer.

In accordance with another embodiment, the outer surface of the dielectric layer is convex and has compound curvature, the edge portion of the display cover layer has an inner surface that is concave and has compound curvature, and the outer surface of the dielectric layer is adjacent to the inner surface of the edge portion of the display cover layer.

In accordance with another embodiment, the antenna includes a millimeter wave antenna and the antenna elements include patch antenna elements.

In accordance with an embodiment, an electronic device is provided that includes a housing having a dielectric layer with a curved inner surface, a dielectric layer having a curved outer surface facing the curved inner surface and having an opposing planar inner surface, and a plurality of millimeter wave antennas each of which has a respective antenna substrate with a planar outer surface facing a respective portion of the planar inner surface and separated from the planar inner surface by an air gap.

In accordance with another embodiment, the dielectric layer includes a glass layer.

In accordance with another embodiment, the electronic device includes a display overlapped by the glass layer, the curved inner surface is formed on an edge portion of the glass layer that overlaps the dielectric layer.

In accordance with another embodiment, the curved inner surface of the dielectric layer has compound curvature and the curved outer surface of the dielectric layer has compound curvature.

The foregoing is merely illustrative and various modifications can be made to the described embodiments. The foregoing embodiments may be implemented individually or in any combination.

What is claimed is:

1. An electronic device, comprising:

a housing;

a display;

a dielectric layer having a first surface that has a curved cross-sectional profile and having an opposing second surface that is planar; and a millimeter wave antenna adjacent to the second surface and separated from the second surface by an air gap.

2. The electronic device defined in claim 1 wherein the millimeter wave antenna comprises an array of millimeter wave patch antenna elements on an antenna substrate with a planar outer surface, wherein the planar outer surface is characterized by a first surface normal, and wherein the second surface is characterized by a second surface normal that is parallel to the first surface normal.

3. The electronic device defined in claim 2 further comprising a display cover layer overlapping the display and overlapping the dielectric layer.

4. The electronic device defined in claim 3 wherein the display cover layer comprises a glass layer.

5. The electronic device defined in claim 4 wherein the glass layer has an inner surface that has a curved cross-sectional profile, wherein the dielectric layer is between the glass layer and the millimeter wave antenna, wherein the first surface faces the inner surface of the glass layer, and wherein the second surface faces the planar outer surface of the antenna substrate.

6. The electronic device defined in claim 5 wherein the dielectric layer comprises polymer.

7. The electronic device defined in claim 3 wherein the housing comprises a head-mounted housing, the electronic device further comprising left and right displays facing away from the display that are configured to display respective left and right images to left and right eye boxes.

8. The electronic device defined in claim 1 further comprising:

a display cover layer overlapping the display, wherein the display cover layer has an edge portion that overlaps the dielectric layer and the millimeter wave antenna.

9. The electronic device defined in claim 8 wherein the edge portion has a concave inner surface of compound curvature.

10. The electronic device defined in claim 9 wherein the first surface of the dielectric layer is convex and has compound curvature.

11. The electronic device defined in claim 1 wherein the millimeter wave antenna comprises an array of millimeter wave antenna elements on an antenna substrate and wherein the air gap comprises an even-thickness air gap between the array of millimeter wave antenna elements and the second surface of the dielectric layer.

12. A head-mounted device, comprising:

a head-mounted housing;

left and right rear-facing displays in the head-mounted housing that are configured to display respective left and right images to eye boxes;

a publicly viewable display facing away from the eye boxes;

a dielectric layer having an outer surface with a curved cross-sectional profile and having a planar inner surface; and an antenna having an array of antenna elements on a planar substrate, wherein the antenna has a planar outer surface separated from the planar inner surface by an air gap.

13. The head-mounted device defined in claim 12 further comprising a display cover layer overlapping the publicly viewable display.

14. The head-mounted device defined in claim 13 wherein the display cover layer has an edge portion with a curved cross-sectional profile that overlaps the dielectric layer.

15. The head-mounted device defined in claim 14, wherein the outer surface of the dielectric layer is convex and has compound curvature, wherein the edge portion of the display cover layer has an inner surface that is concave and has compound curvature, and wherein the outer surface of the dielectric layer is adjacent to the inner surface of the edge portion of the display cover layer.

16. The head-mounted device defined in claim 12 wherein the antenna comprises a millimeter wave antenna and wherein the antenna elements comprise patch antenna elements.

17. An electronic device, comprising:

a housing having a first dielectric layer with a curved inner surface;

a second dielectric layer having a curved outer surface facing the curved inner surface and having an opposing planar inner surface; and a plurality of millimeter wave antennas each of which has a respective antenna substrate with a planar outer surface facing a respective portion of the planar inner surface of the second dielectric layer and separated from the planar inner surface of the second dielectric layer by an air gap.

18. The electronic device defined in claim 17 wherein the first dielectric layer comprises a glass layer.

19. The electronic device defined in claim 18 further comprising:

a display overlapped by the glass layer, wherein the curved inner surface of the first dielectric layer is formed on an edge portion of the glass layer that overlaps the second dielectric layer.

20. The electronic device defined in claim 19 wherein the curved inner surface of the first dielectric layer has compound curvature and wherein the curved outer surface of the second dielectric layer has compound curvature.

* * * * *